United States Patent
Thurfjell et al.

(10) Patent No.: US 11,283,499 B2
(45) Date of Patent: Mar. 22, 2022

(54) FIRST COMMUNICATION DEVICE AND METHODS THEREBY FOR INITIATING TRANSMISSION BASED ON AN OBTAINED SET OF CORRESPONDENCES

(71) Applicant: Telefonaktiebolaget LM Ericsson (publ), Stockholm (SE)

(72) Inventors: Magnus Thurfjell, Luleå (SE); Sven-Olof Jonsson, Hortlax (SE); Peter Ökvist, Luleå (SE); Sven Petersson, Sävedalen (SE); Arne Simonsson, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 268 days.

(21) Appl. No.: 16/344,664

(22) PCT Filed: Feb. 15, 2017

(86) PCT No.: PCT/SE2017/050142
§ 371 (c)(1),
(2) Date: Apr. 24, 2019

(87) PCT Pub. No.: WO2018/013026
PCT Pub. Date: Jan. 18, 2018

(65) Prior Publication Data
US 2020/0059280 A1    Feb. 20, 2020

(30) Foreign Application Priority Data

Jul. 15, 2016  (WO) ............... PCT/SE2016/050723

(51) Int. Cl.
*H04B 7/06*   (2006.01)
*G01S 3/52*   (2006.01)
(Continued)

(52) U.S. Cl.
CPC ........... *H04B 7/0617* (2013.01); *G01S 3/043* (2013.01); *G01S 3/52* (2013.01); *H01Q 3/24* (2013.01);
(Continued)

(58) Field of Classification Search
CPC . G01S 11/10; G01S 3/043; G01S 3/14; G01S 5/0247; H01Q 21/28; H01Q 3/24;
(Continued)

(56) References Cited

U.S. PATENT DOCUMENTS

2015/0085838 A1* 3/2015 Benjebbour ......... H04B 7/0617
370/336
2015/0349863 A1* 12/2015 Elayach ............... H04B 7/0404
375/295

FOREIGN PATENT DOCUMENTS

EP    2897304 A1    7/2015
WO    2015183472 A1   12/2015

OTHER PUBLICATIONS

International Search Report and Written Opinion dated May 22, 2017 for International Application No. PCT/SE2017/050142 filed on Feb. 15, 2017, consisting of 8-pages.
(Continued)

*Primary Examiner* — Harry H Kim
*Assistant Examiner* — M Mostazir Rahman
(74) *Attorney, Agent, or Firm* — Sage Patent Group

(57) ABSTRACT

A method performed by a first communication device operating in a wireless communications network. The first communication device obtains a set of correspondences associating: i) each set ($\omega_i$) of a plurality of sets of antenna weights ($\omega_1 \ldots \omega_i$) having been sent by a third communication device in response to having received a respective set ($RSs_i$) of a plurality of sets of radio signals ($RSs_1 \ldots RSs_i$) from a set of antenna ports in a second communication device,
(Continued)

with ii) a respective direction of transmission ($d_i$) between the second communication device and the third communication device. The respective direction is relative to an orientation ($\alpha_i$) of the second communication device. The respective direction of transmission ($d_i$) is a selected direction of transmission ($d_{i,sel}$). The first communication device then initiates transmission of a new radio signal, based on the obtained set of correspondences.

17 Claims, 9 Drawing Sheets

(51) Int. Cl.
   *H01Q 3/24* (2006.01)
   *H01Q 21/28* (2006.01)
   *H04B 7/0456* (2017.01)
   *G01S 3/04* (2006.01)
(52) U.S. Cl.
   CPC .......... *H01Q 21/28* (2013.01); *H04B 7/0456* (2013.01); *H04B 7/0608* (2013.01)

(58) Field of Classification Search
   CPC .. H04B 7/0456; H04B 7/0608; H04B 7/0617; H04B 7/0695; H04B 7/088
   See application file for complete search history.

(56) References Cited

OTHER PUBLICATIONS

3GPP TS 36.211 V14.0.0; 3rd Generation Partnership Project; Technical Specification Group Radio Access Network Evolved Universal Terrestrial Radio Access (E-UTRA); Physical channels and modulation (Release 14); Sep. 2016, consisting of 170-pages.
Office Action issued in corresponding EP Application No. 17705710.6 dated Feb. 10, 2020, 05 Pages.
Office Action issued in corresponding EP Application No. 17705710.6 dated Sep. 7, 2020, 05 Pages.

* cited by examiner c)

| Direction of trasmission/orientation | Set of radio signals | Set of antenna weights |
|---|---|---|
| $d_{1,\alpha_1}$ — | $RSs_1$ — | $\omega_1$ |
| $d_{2,\alpha_2}$ — | $RSs_2$ — | $\omega_2$ |
| ⋮ | ⋮ | ⋮ |
| $d_{j,\alpha_j}$ — | $RSs_j$ — | $\omega_j$ |

Set of correspondences ⌒ 400

| Direction of trasmission/orientation | Set of antenna weights |
|---|---|
| $d_{1,\alpha_1}$ — | $\omega_1$ |
| $d_{2,\alpha_2}$ — | $\omega_2$ |
| ⋮ | ⋮ |
| $d_{j,\alpha_j}$ — | $\omega_j$ |

FIRST COMMUNICATION DEVICE AND METHODS THEREBY FOR INITIATING TRANSMISSION BASED ON AN OBTAINED SET OF CORRESPONDENCES

CROSS-REFERENCE TO RELATED APPLICATIONS

This application is a Submission Under 35 U.S.C. § 371 for U.S. National Stage Patent Application of International Application No.: PCT/SE2017/050142, filed Feb. 15, 2017 entitled "FIRST COMMUNICATION DEVICE AND METHODS THEREBY FOR INITIATING TRANSMISSION BASED ON AN OBTAINED SET OF CORRESPONDENCES," which claims priority to International Application No. PCT/SE2016/050723, filed Jul. 15, 2016, the entireties of both of which are incorporated herein by reference.

TECHNICAL FIELD

The present disclosure relates generally to a first communication device and methods performed thereby to initiate transmission based on an obtained set of correspondences. The present disclosure further relates to a computer program product, comprising instructions to carry out the actions described herein, as performed by the first communications device. The computer program product may be stored on a computer-readable storage medium.

BACKGROUND

Communication devices within a wireless communications network may be e.g., stations (STAs), User Equipments (UEs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g. between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Communication devices may also be network nodes, or Transmission Points (TP). The wireless communications network covers a geographical area which may be divided into cell areas, each cell area being served by an access node such as a Base Station (BS), e.g. a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams.

In the context of this disclosure, the expression Downlink (DL) is used for the transmission path from the base station to the wireless device. The expression Uplink (UL) is used for the transmission path in the opposite direction i.e., from the wireless device to the base station.

In 3rd Generation Partnership Project (3GPP) Long Term Evolution (LTE), network nodes, which may be referred to as eNodeBs or even eNBs, may be directly connected to one or more core networks.

5G access is expected to be implemented at higher frequency bands. At high frequencies, coverage is a challenge. For uplink, in certain scenarios transmit beam forming is expected to be necessary to achieve sufficient coverage.

Multi-Antenna Techniques and Codebook-Based Precoding

Multi-antenna techniques may significantly increase the data rates and reliability of a wireless communication system. The performance may be in particular improved if both the transmitter and the receiver are equipped with multiple antennas, which results in a Multiple-Input Multiple-Output (MIMO) communication channel. Such systems and/or related techniques are commonly referred to as MIMO.

The LTE standard is currently evolving with enhanced MIMO support. A component in LTE may be the support of MIMO antenna deployments and MIMO related techniques. Currently, LTE-Advanced may support an 8-layer spatial multiplexing mode for 8 Transmit (TX) antennas with channel dependent precoding. The spatial multiplexing mode is aimed for high data rates in favorable channel conditions. Spatially multiplexing in different layers may be understood as transmitting multiple data streams over different beams, each pointing at different directions, such that each data stream may reach a receiver through a distinct radio path and may be separated from the other data streams at the receiver. Each of the distinct radio paths may be considered as a layer. In spatial multiplexing, each layer is associated with a unique reference signal for demodulation. An illustration of the spatial multiplexing operation is provided in the schematic diagram of FIG. 1. A precoding vector, used to form a beam, may be associated with each layer.

As illustrated in FIG. 1, the information carrying symbol vector $s=[s(1), s(2), \ldots, s(r)]$ may be multiplied by an $N_T \times r$ precoder matrix W, which may serve to distribute the transmit energy in a subspace of the $N_T$ dimensional vector space, $N_T$ corresponding to $N_T$ antenna ports. Each of the $N_T$ antenna ports may be associated with a unique reference signal. Each antenna port may be understood to be associated with a unique reference signal in identifying the antenna port. Therefore, transmitting two radio signals, for example LTE physical signals or physical channels, over an antenna port may comprise transmitting the radio signals through an antenna element, or set of antenna elements, such that they may be perceived by a receiver as propagating through the same radio propagation channel. An example of antenna ports may be found in 3GPP TS 36.211, section 6.10.5. When a receiver estimates the channel associated with a reference signal, the channel from that antenna port may be said to be estimated. In the example shown in FIG. 1, the information symbol s may be transmitted from $N_T$ antenna ports. The receiver may use the reference signal associated with each of the $N_T$ antenna ports to estimate the corresponding channels, and use the channel estimates to demodulate the information s. The precoder matrix may be typically selected from a codebook of possible precoder matrices, and may be typically indicated by means of a Precoder Matrix Indicator (PMI), which may specify a unique precoder matrix in the codebook for a given number of symbol streams. Each of the r symbols in $s=[s(1), s(2), \ldots, s(r)]$ corresponds to a layer and r may be referred to as the transmission rank. In this way, spatial multiplexing may be achieved since multiple symbols may be transmitted simultaneously over the same Time/Frequency Resource Element (TFRE), which may also be referred to as a Resource Element (RE). The number of symbols r may be typically adapted to suit the current channel properties. That is, the number of symbols r may be typically adapted to match the number of layers that may be carried in the current channel.

The precoder matrix may often be chosen to match the characteristics of the $N_R \times N_T$ MIMO channel matrix $H_n$, which is a is a $N_R \times N_T$ channel matrix representing the MIMO channel over the subcarrier, or TFRE, resulting in so-called channel dependent precoding. This may be also commonly referred to as closed-loop precoding and may strive for focusing the transmit energy into a subspace which is strong in the sense of conveying much of the transmitted energy to the receiver. In addition, the precoder matrix may also be selected to strive for orthogonalizing the channel, meaning that after proper linear equalization at the UE, the inter-layer interference may be reduced.

The transmission rank, and thus the number of spatially multiplexed layers, may be reflected in the number of columns of the precoder. For efficient performance, a transmission rank that matches the channel properties may be selected.

The mapping of the antenna ports onto the N antenna elements may be understood as being related to an implementation of the device. Each antenna port may for instance be mapped to two or four antenna elements out of the total N antenna elements, known as a subarray. This mapping of antenna ports onto physical antenna elements may be known as antenna virtualization. The set of antennas that a single antenna port is using may be denoted a sub-array. The virtualization may be described by a precoding weight vector, or a matrix, which may describe how the phase and amplitude may be adjusted for each antenna within the subarray.

Precoding may be interpreted as multiplying a signal with different beamforming weights for each antenna port prior to transmission.

Beam Selection

For transmissions using beamforming, there are two basic methods for selecting a beam and setting antenna weights, that is, selecting a pre-coder. The first is closed-loop beamforming, which is based on uplink measurements which are reported back from the network node to the wireless device. The second is open loop beamforming in Time Division Duplexing (TDD), which relies on the reciprocity between downlink and uplink channels.

Existing closed-loop methods in LTE using multi-antenna arrays are associated with wastage of resources in devices, as for example they may need to perform measurements. During this type of communications, for example, unnecessary transmissions of sounding reference signals and measurements may occur, delaying transmission of other data and wasting resources, all resulting in loss of channel efficiency, and in turn degraded communication. Closed-loop methods also suffer from reporting delay. This reporting delay may be significant if the wireless device is moving.

A second problem is eNB energy consumption and complexity, that is, computational complexity, since the complexity increases at least linearly with the number of ports to estimate the channel for. The eNB may need to measure all ports periodically, even when it may not receive any data from the eNB. These measurements will also adversely impact UE battery life. Therefore, an additional problem is feedback overhead on the downlink for periodically reporting for the full antenna array.

Open-loop approaches require that the same antennas are used in the wireless device for both transmission and reception. However, device implementations are sometimes done with separate transmit and receive antennas, as this may e.g., remove the need for components such as splitters, combiners, duplex filters, etc. If there are a larger number of receive antennas this may not easily improve the beam forming accuracy.

Moving wireless devices pose an even greater challenge for beam selection in beamforming transmission. In beamforming, the coverage of each beam is narrow, and a moving device may continuously need to re-assess the most optimal beam chosen for coverage.

SUMMARY

It is an object of the embodiments herein to improve beamforming transmission in a wireless communications network. It is a particular object of the embodiments herein to improve beamforming uplink transmission in a wireless communications network.

According to a first aspect of embodiments herein, the object is achieved by a method performed by a first communication device. The first communication device operates in a wireless communications network 100. The first communication device obtains a set of correspondences associating: i) each set of a plurality of sets of antenna weights having been sent by a third communication device in response to having received a respective set of a plurality of sets of radio signals from a set of antenna ports in a second communication device, with ii) a respective direction of transmission between the second communication device and the third communication device, the respective direction being relative to an orientation of the second communication device, and the respective direction of transmission $d_i$ being a selected direction of transmission. The first communication device initiates transmission of a new radio signal, based on the obtained set of correspondences.

According to a second aspect of embodiments herein, the object is achieved by a first communication device configured to operate in the wireless communications network. the first communication device being further configured to obtain the set of correspondences associating: i) each set of the plurality of sets of antenna weights configured to have been sent by a third communication device in response to having received a respective set of a plurality of sets of radio signals from a set of antenna ports in a second communication device, with ii) a respective direction of transmission between the second communication device and the third communication device, the respective direction being configured to be relative to an orientation of the second communication device, and the respective direction of transmission being configured to be a selected direction of transmission. The first communication device initiates transmission of a new radio signal, based on the set of correspondences configured to be obtained.

According to a third aspect of embodiments herein, the object is achieved by a computer program. The computer program comprises instructions which, when executed on at least one processor, cause the at least one processor to carry out the method performed by the first communication device.

According to a fourth aspect of embodiments herein, the object is achieved by computer-readable storage medium. The computer-readable storage medium has stored thereon a computer program comprising instructions which, when executed on at least one processor, cause the at least one processor to carry out the method performed by the first communication device.

By obtaining the set of correspondences, e.g., a table, and then initiating transmission based on the obtained set of correspondences, the first communication device is either enabled itself, or it enables another communication device in the wireless communications network, such as the second communication device or the third communication device, to transmit the new radio signal, for a selected direction of transmission relative to an given orientation of the communication device performing the transmission, with a set of antenna weights that is optimized for transmission of a beam in the selected direction, with set of antenna ports of the second communication device, without the need to perform closed-loop transmission. Signalling overhead and latency is therefore decreased, the capacity of the system is increased, and the battery life of the communication device performing the transmission of the new radio signal is also saved.

BRIEF DESCRIPTION OF THE DRAWINGS

Examples of embodiments herein are described in more detail with reference to the accompanying drawings, in which.

DETAILED DESCRIPTION

Figure 1:
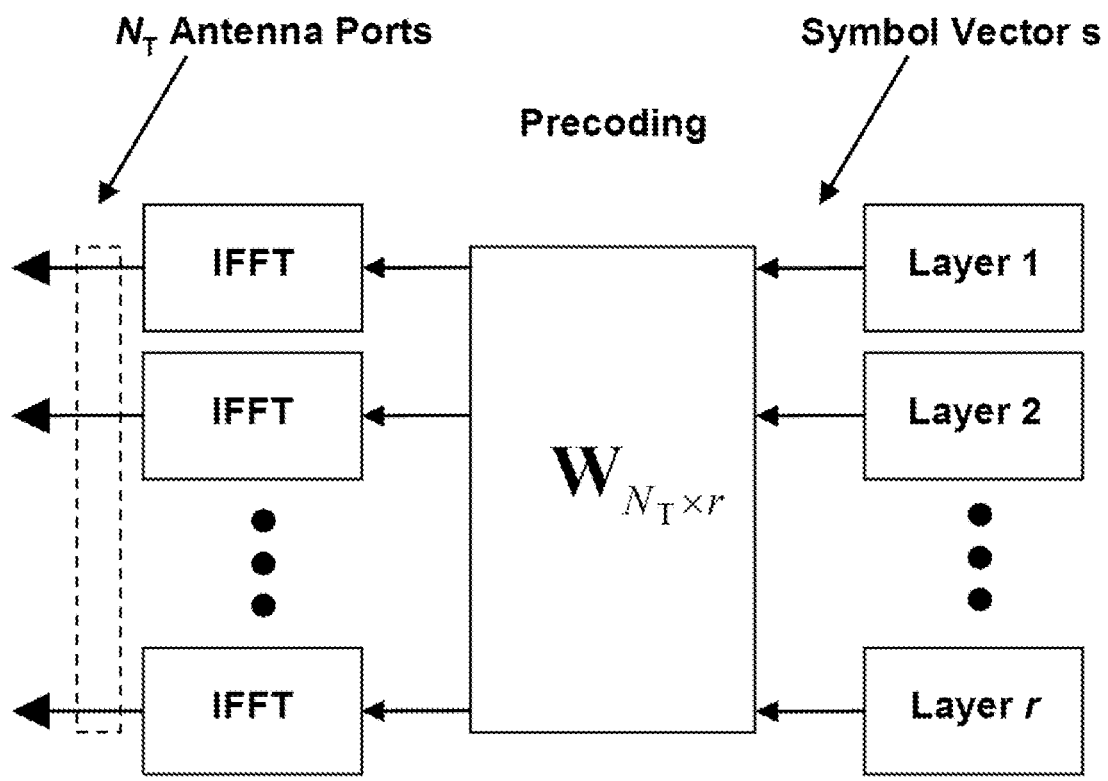
FIG. 1 is a schematic block diagram illustrating transmission structure of precoded spatial multiplexing mode in LTE.

As part of the development of the embodiments disclosed herein, a problem associated with existing methods will first be identified and discussed.

Recently developed methods estimate the preferred physical direction to transmit in the uplink from a wireless device, e.g., to a network node, without requiring the involvement of the actual transmit antennas in the wireless device. This is achieved by the use of a Doppler analysis of downlink transmissions and information on the orientation of the wireless device. With the Doppler analysis and the information, the preferred uplink transmission direction may be estimated using only one receive antenna in the wireless device, which does not necessarily have to be part of the transmitter antenna set. An overview description of these methods is reproduced herein in the section entitled "Beam direction selection for a radio communications device".

Once the preferred direction of transmission to e.g., the network node, has been determined for transmission, for providing the strongest radio link between two communication devices, the antenna weights to transmit a beam in the selected direction may need to be determined, e.g., via closed-loop methods. In the case where the transmit direction is estimated without involvement of the transmit antennas in the wireless device, as in performed in the methods described in the section "Beam direction selection for a radio communications device", it may be difficult to translate the direction to an appropriate set of transmit weights. The methods described in the section "Beam direction selection for a radio communications device" are based on the assumption that the wireless device has structured antenna configurations like e.g., linear arrays, to allow easily determined relations between beam direction and antenna element phase shifts for beam forming. A phase shift may be understood as the phase of a complex antenna weight and may define e.g., the beam shape when individual phase shifts are applied to a set of antenna elements. However, the set of transmit antennas in the wireless device may e.g., not be arranged in a linear array or any other well-structured configuration. This makes it hard in general to calculate appropriate beamforming weights given a specific physical transmit direction from the wireless device, since the weights are related to the physical distances and positions of the elements relative to each other.

If appropriate beamforming weights may not be calculated, the wireless device may not be able to produce a beam in the preferred uplink transmit direction, relative to the wireless device.

Embodiments herein address the foregoing problems of the existing methods. In general, embodiments herein may be understood to relate to a communication device-relative transmit direction training method. As a summarized overview, embodiments herein may be understood to relate to a method for initially building up a table with transmit weights mapped to different transmit directions relative to the orientation of the transmitting communication device, e.g., a UE. This may be done by initially using an evaluation of transmitting communication device-relative transmit direction, such as the method described in the section "Beam direction selection for a radio communications device", together with uplink sounding and closed loop beam forming. The transmit weights that the receiving communication device, e.g., a base station, may report back to the transmitting communication device in closed loop may then be mapped to the estimated communication device-relative transmit direction, detected, e.g. using methodology described in the section "Beam direction selection for a radio communications device", and stored for future use. After a while, when data for multiple directions may have been collected, a complete table of directions relative to the communication device and their corresponding transmit weights may be set up and stored. This table may then be used together with the method described in the section "Beam direction selection for a radio communications device", without further support from uplink sounding.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Figure 2:
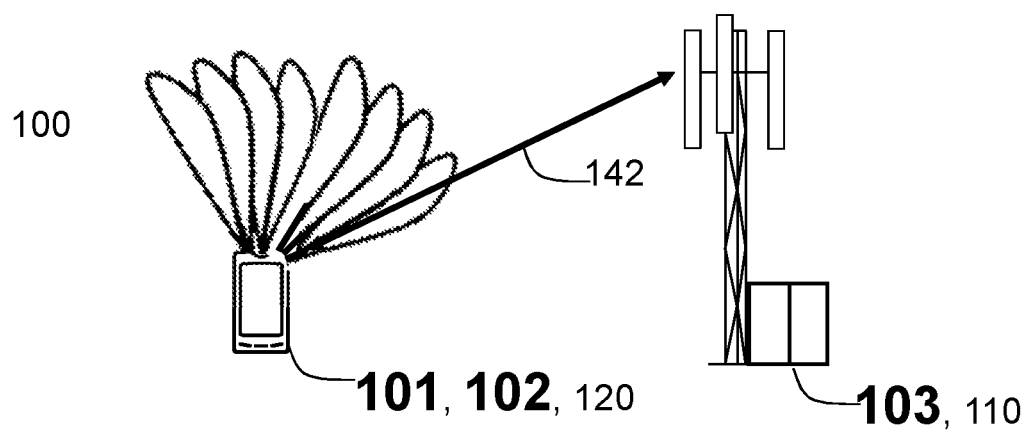
FIG. 2 is a schematic diagram illustrating embodiments of a wireless communications network, according to embodiments herein.
Figure 2:
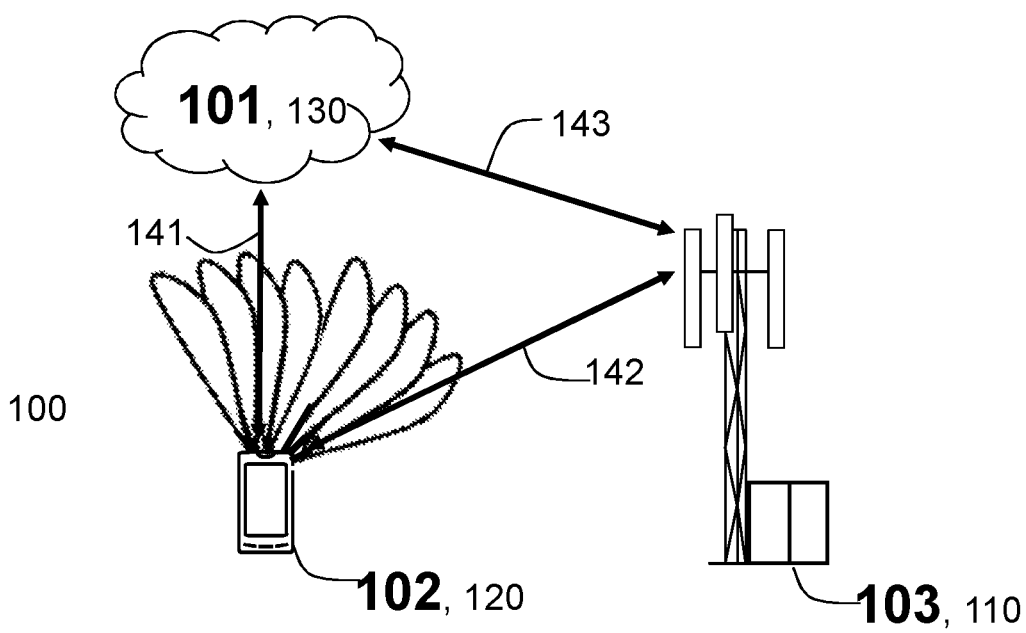

FIG. 2 depicts two non-limiting examples, in panels a and b respectively, of a wireless communications network 100, sometimes also referred to as a radio system, radio network or wireless communications system, in which embodiments herein may be implemented. The wireless communications network 100 may be a network using beamforming. The wireless communications network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi network, Worldwide Interoperability for Microwave Access (WiMax), 3GPP New Radio (NR) or another 5G system or any cellular network or system. Thus, although terminology from LTE may be used in this disclosure to exemplify embodiments herein, this should not be seen as limiting the scope of the embodiments herein to only the aforementioned system. Other wireless systems may also benefit from exploiting the ideas covered within this disclosure. It may also be understood that the wireless communication network 100 may operate in one or more of licensed, license assisted, and unlicensed spectrum.

The wireless communications network 100 comprises a plurality of communication devices whereof a first communication device 101, a second communication device 102, and a third communication device 103 are depicted in both examples of FIG. 2. The first communication device 101 may be a network node such as the network node 110 described below, or a or a wireless device, such as the wireless device 120 described below. The second communication device 102 is a wireless device, such as the wireless device 120 described below. The second communication device 102 has beamforming capability. The third communication device 103 may be a network node such as the network node 110 described below or another wireless device, such as the wireless device 120 described below.

In a typical scenario, the third communication device 103 may be a transmission point serving the second communication device 102, which may typically be the wireless device 120 with beamforming capability, as depicted in both examples of FIG. 2. Also in a typical scenario, such as that depicted in panel a) of FIG. 2, the first communication device 101 may be the same as the second communication device 102, the wireless device 120.

In some examples, such as that depicted in panel b) of FIG. 2, the first communication device 101 may be a node in the cloud 130, that is, a so-called virtual node or virtual machine. In yet other examples, the first communication device 101 may be, e.g., a core network node, such as, e.g., Mobility Management Entity (MME), Self-Optimizing/Organizing Network (SON) node, a coordinating node, positioning node, Minimization of Drive Test (MDT) node, etc. . . .

The wireless communications network 100 comprises a plurality of network nodes whereof two examples of a network node 110 are depicted in FIG. 2. In some embodiments, the radio network node 110 may be Transmission Point, such as e.g., a base station, an eNB, eNodeB, or a Home Node B, a Home eNodeB, femto Base Station, BS, Radio Access Point, Remote Radio Unit (RRU), Remote Radio Head (RRH), or any other network unit capable to serve a wireless device or a machine type communication device in the wireless communications network 100. In such embodiments, the network node 110 may be e.g., a Wide Area Base Station, Medium Range Base Station, Local Area Base Station and Home Base Station, based on transmission power and thereby also coverage size. The network node 110 may be a stationary relay node or a mobile relay node. The network node 110 may support one or several communication technologies, and its name may depend on the technology and terminology used. In some non-limiting examples, the network node 110 may serve receiving nodes such as the second communication device 102, with serving beamformed beams, which may also be referred to herein simply as beams. In some embodiments, the network node 110 may correspond to any type of radio network node or any network node, which communicates with at least a radio network node.

In 3GPP LTE, any of the third communication device 103 and the second communication device 102 may be directly connected to one or more networks.

A number of wireless devices may be located in the wireless communications network 100. In the example scenario of FIG. 2, a wireless device 120 is shown. The wireless device 120, such as a UE, may be also known as e.g. mobile terminal, wireless terminal and/or mobile station, mobile telephone, cellular telephone, or laptop with wireless capability, or a Customer Premises Equipment (CPE), just to mention some further examples. The wireless device in the present context may be, for example, portable, pocket-storable, hand-held, computer-comprised, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles, CPE or any other radio network unit capable of communicating over a radio link in the wireless communications network 100. The wireless device may be wireless, i.e., it may be enabled to communicate wirelessly in the wireless communication network 100 and may be able support beamforming transmission. The communication may be performed e.g., between two devices, between a device and a network node, and/or between a device and a server. The communication may be performed e.g., via a RAN and possibly one or more core networks, comprised within the wireless communications network 100.

The first communication device 101 may communicate with the second communication device 102 over a first link 141, e.g., a radio link. The second communication device 102 may communicate with the third communication device 103 over a second link 142, which may be a radio link. The first communication device 101 may communicate with the third communication device 103 over a third link 143, e.g., a radio link or a wired link.

Any reference herein to the terms "first", "second" or "third" will be understood to refer a manner of distinguishing between different instances of the terms they may modify. "First", "second", or "third" are not intended to confer a cumulative or chronological meaning to the terms they modify.

Figure 3:
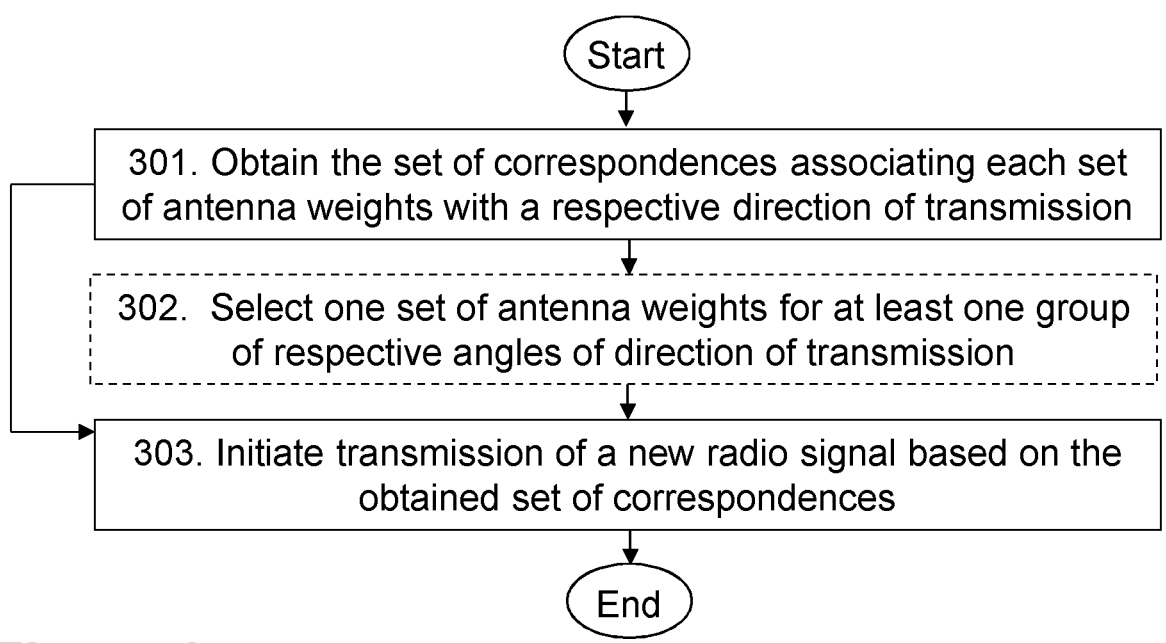
FIG. 3 is a schematic diagram illustrating embodiments of a set of correspondences, according to embodiments herein.

Embodiments of a method performed by the first communication device 101, will now be described with reference to the flowchart depicted in FIG. 3. The first communication device 101 operates in the wireless communications network 100.

The method may comprise the actions described below. In some embodiments all the actions may be performed. In some embodiments, one or more actions may be performed. One or more embodiments may be combined, where applicable. All possible combinations are not described to simplify the description. In FIG. 3, optional actions are indicated with dashed lines.

Action 301

Embodiments herein may be understood to start from the assumption that the second communication device 102, e.g., a UE supporting beamforming transmission in the uplink, may have some information on a preferred uplink transmit direction, also referred to herein as a "selected direction of transmission", e.g. by using the method described below in the section "Beam direction selection for a radio communications device". The selected direction of transmission may be that direction of transmission whereby the second radio link 142 between the second communication device 102 and the third communication device 103 may be the strongest. As is the case with the method described below in the section "Beam direction selection for a radio communications device", the assumption may be understood as that the selected direction, which may be a known direction, is a direction relative to the orientation of the second communication device 102. That is, a transmission direction defined with the second communication device 102 as a reference. No information on the absolute direction may be necessary. For example, it may not be necessary to know if the direction is towards the third communication device 103, or if the second communication device 102 is in Line-of-Sight (LoS) or in No-Line-of-Sight (NLoS), etc. ...

Once the direction of transmission is selected, as described in the method in the section "Beam direction selection for a radio communications device", the second communication device 102 may not obtain any feedback from the third communication device 103 on a precoder to use to achieve a beam in the selected direction of transmission. Therefore, initially, the second communication device 102 may have little knowledge on which uplink transmission weights, or precoder, to use to produce a beam in the selected direction of transmission relative to the orientation of the second communication device 102, that is, the preferred second communication device 102-relative uplink transmit direction. This may be especially the case if the physical arrangement of the antennas in the second communication device 102 is not well-structured in a linear array, or similar.

In order for the second communication device 102, or any other communication device supporting beamforming transmission in the UL, to produce a beam with a set of antenna ports in a selected direction of transmission relative to a certain orientation of the second wireless device 102, it may be desirable to have a tool whereby, providing as input a desired or selected direction of transmission, relative to a certain orientation of the second wireless device 102 at a given time, the second wireless device 102 may obtain a recommended set of antenna weights to use on its antenna ports to produce a beam in that selected direction. This "tool" may be referred to herein as a set of correspondences, e.g., a table, as described below, which may be obtained in this Action 301.

The manner in which the obtaining may be performed may depend on whether the first communication device 101 is the same as the second communication device 102 or not, as will now be explained.

Figure 4:
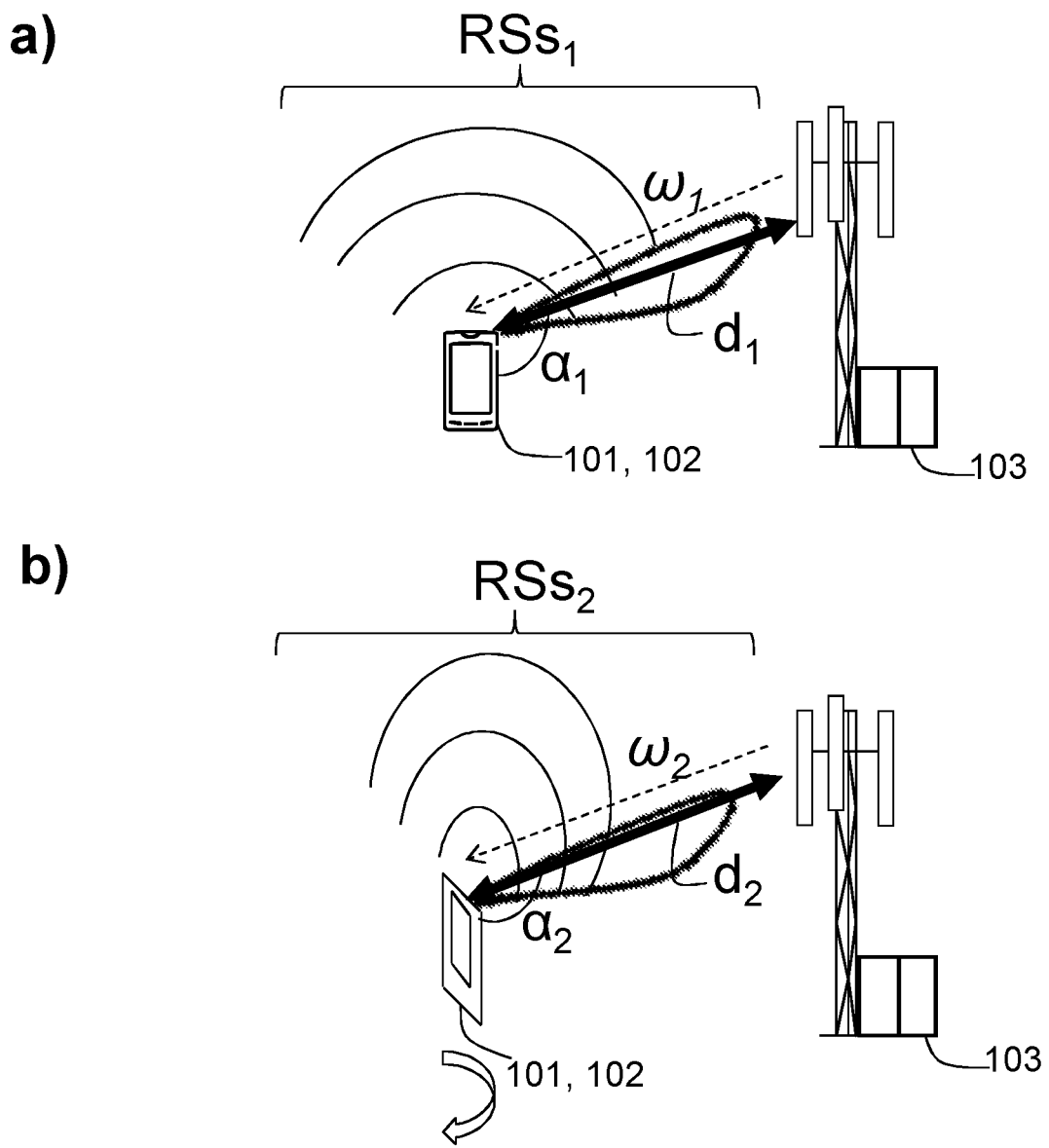
FIG. 4 is a flowchart depicting embodiments of a method in a first communication device, according to embodiments herein.
Figure 4:

To facilitate the description of this Action 301 by making use of illustration, reference will be made to the FIG. 4. The second communication device 102 may repeatedly send a plurality of sets of radio signals $RSs_1 \ldots RSs_i$ from a set of antenna ports in the second communication device 102. The radio signals in any set of the plurality of sets of radio signals $RSs_1 \ldots RSs_i$ may be Reference Signals (RS), such as Sounding RS (SRS). FIG. 4 is a schematic illustration of this process with two non-limiting examples. In panel a) of FIG. 4, a first set of radio signals $RSs_1$ is sent when the second communication device 102 is in a first orientation $\alpha_1$. The first orientation $\alpha_1$ may correspond to a first Angle of Arrival (AoA) or Angle of Departure (AoD), as described later. In panel b) of FIG. 4, the second communication device 102 has turned in the direction of the curved arrow, and a second set of radio signals $RSs_2$ is sent when the second communication device 102 is in a second orientation $\alpha_2$. Each set $RSs_i$ of the plurality of sets of radio signals $RSs_1 \ldots RSs_i$ may comprise non-beamformed uplink sounding RS per antenna port. Each set of RS is represented in panels a) and b) of FIG. 4 as three semi-circles. The antenna ports that may be used to transmit the plurality of sets of radio signals $RSs_1 \ldots RSs_i$ may be the same as those over which the beamforming will later take place. In response to the transmission of each of these plurality of sets of radio signals $RSs_1 \ldots RSs_i$, the second communication device 102 may receive a set of antenna weights $\omega_i$. That is, a preferred precoder from the third communication device 103, e.g., a base station.

A preferred direction of transmission as previously selected e.g., by the method described below in the section "Beam direction selection for a radio communications device", is represented in panels a) and b) of FIG. 4 as a thick arrow, and denoted as $d_1$ and $d_2$, respectively. The preferred direction of transmission is a selected direction of transmission between the second communication device 102 and the third communication device 103, and is relative to an orientation $\alpha_i$ of the second communication device 102. This is denoted in FIG. 4 as $d_{i, \alpha i}$.

Each reported set of antenna weights co, may then be associated with the selected direction of transmission $d_{i, \alpha i}$, relative to the orientation $\alpha_i$ of the second communication device 102 at e.g., the time of transmission of a respective set $RSs_i$ of the plurality of sets of radio signals $RSs_1 \ldots RSs_i$. In other words, each reported set of antenna weights co, may then be associated with the preferred second communication device 102-relative uplink transmit direction. Respective may be understood as corresponding.

After a while of repeating this process for different, or even all, selected directions of transmission $d_i$ relative to the orientation αi of the second communication device 102, $d_{i,\alpha i}$, a set of correspondences 400 or table may be set up as depicted in panel c) of FIG. 4, associating different relative uplink transmit directions with appropriate precoder choices.

According to the foregoing, in this Action 301, the first communication device 101, obtains a set of correspondences 400 associating: i) each set co, of a plurality of sets of antenna weights $\omega_1 \ldots \omega_i$ having been sent by the third communication device 103 in response to having received the respective set $RSs_i$ of the plurality of sets of radio signals $RSs_1 \ldots RSs_i$ from the set of antenna ports in the second communication device 102, with ii) a respective direction of transmission $d_i$ between the second communication device 102 and the third communication device 103, the respective direction being relative to the orientation $\alpha_i$ of the second communication device 102. The respective direction of transmission $d_i$ is the selected direction of transmission $d_{i,\alpha i}$.

The respective direction of transmission $d_i$ may be selected, for each set $RSs_i$ of the plurality of sets of radio signals $RSs_1 \ldots RSs_i$, based on a strength of a radio link, e.g., the second link 142, between the second communication device 102 and the third communication device 103. The selection of the respective direction of transmission $d_i$ may have been performed as described below in the section "Beam direction selection for a radio communications device".

"Associating . . . with" may be understood as referring to being defining for, or setting in correspondence to, assigning to, or similar expressions.

Obtaining may be understood in this Action 301 as any of, e.g., determining, calculating, constructing, creating, retrieving, or receiving from another node in the wireless communication network 100, e.g., the second communication device 102. The manner in which the obtaining may be performed may depend on whether the first communication device 101 is the same as the second communication device 102 or not.

In some examples wherein the first communication device 101 may be the same as the second communication device 102, e.g., a UE, the obtaining of the set of correspondences 400 in this Action 301 may be implemented by performing the procedure described in relation to FIG. 4 by the second communication device 102.

In some examples wherein the first communication device 101 may be different than the second communication device 102, and be e.g., the node in the cloud 130, the obtaining of the set of correspondences 400 in this Action 301 may be performed by receiving a respective indication for each of the obtained correspondences e.g., illustrated in panel c) of FIG. 4, from the second communication device 102 or from the third communication device 103, and storing them, and constructing the set of correspondences 400. If the respective indication is received from the third communication device 103, the third communication device 103 may have received the directional information from the second communication device 102. Alternatively, the first communication device 101 may obtain the set of correspondences 400 in this Action 301 by receiving the set of correspondences 400, already constructed, from e.g., the second communication device 102.

In yet another alternative example, the first communication device 101 may obtain the set of correspondences 400 by receiving it from the third communication device 103. In such examples, the third communication device 103 may have constructed by the set of correspondences 400 by collecting each of the obtained correspondences ($d_{i,\alpha i}, \omega_i$) e.g., illustrated in panel c of FIG. 4, and then providing them to the first communication device 101.

Furthermore, in some examples wherein the first communication device 101 may be another UE different than the second communication device 102, the obtaining in this Action 301 of the set of correspondences 300 may comprise receiving the set of correspondences 400 from e.g., the third communication device 103. This may be particularly the case in examples wherein the first communication device 101 is a UE with a same antenna array arrangement as the second communication device 102, e.g., a UE of the same type.

Action 302

In some embodiments, each respective direction of transmission $d_i$ may correspond to a respective angle $\alpha_i$ of direction of transmission, and the obtained set of correspondences 400 may be organized according to groups of respective angles of direction of transmission. In other words, the set of correspondences 400 may be divided into a set of angle intervals, where each interval may represent a range of relative uplink transmit directions. Intervals may not need to be of equal size. When a sufficient number of sets of antenna weights co e.g. at least one per interval may have been collected, the set of correspondences 400, with one respective set of antenna weights co, per interval may be created.

After a while, one or more suggested sets of antenna weights co, may be associated with each interval. That is, in some embodiments, at least one group of respective relative angles of direction of transmission may be associated with more than one respective set of antenna weights $\omega_i$. In such embodiments, the first communication device 101 may, in this Action 302, select one of the more than one set of antenna weights $\omega_i$ of the plurality of sets of antenna weights $\omega_1 \ldots \omega_i$ based on at least one of: i) a most frequent set of antenna weights $\omega_i$ of the more than one set of antenna weights co ii) an average of the more than one set of antenna weights co and iii) channel quality measurements. The respective angles of direction of transmission may be understood to be respective relative angles of direction of transmission.

According to i), the first communication device 101 may select the most frequently proposed set of antenna weights $\omega_i$ in the set during obtaining or refinement of the set of correspondences 400.

According to ii), the first communication device 101 may perform some averaging over the sets of antenna weights co e.g. by averaging phase shifts between the different pairs of antennas.

According to iii), the first communication device 101 may weight a reliability of the information in the set of antenna weights co, on the channel quality at the moment of measurement.

The number of intervals may vary depending on the accuracy of the selected direction of transmission $d_{i,\alpha i}$, and also the number of antennas. The tradeoff may be a longer period in time using uplink sounding, if the range of each interval is smaller.

As the antenna separation at the second communication device 102 may likely be large, at least between some of the elements, the set of correspondences 400 may contain multiple frequency intervals.

Action 303

In this Action 303, the first communication device 101 initiates transmission of a new radio signal, based on the obtained set of correspondences 400. The new radio signal may be information, such as data or control information. The transmission of the new signal may be implemented with beamforming. The first communication device 101 may be one of: a) a same communication device as the second communication device 102, wherein the transmission of the new radio signal may then be from the set of antenna ports; and b) a different communication device, e.g., the node in the cloud 130, than the second communication device 102, wherein the transmission of the new radio signal may be from a different set of antenna ports.

The initiating 303 of the transmission may be understood to comprise transmitting, or facilitating, enabling or triggering transmission e.g., in another communication device.

In some embodiments, the initiating 303 of the transmission may further comprise transmitting, to one of: the second communication device 102 and the third communication device 103, the new radio signal, the transmitting 206 being based on the obtained set of correspondences 400. In examples wherein the first communication device 101 is the second communication device 102, the the initiating 303 of the transmission may comprise transmitting the new radio signal to the third communication device 103.

In other examples, the initiating 303 of the transmission may be implemented by providing or sending the obtained set of correspondences to another communication device in the wireless communications network 100. This may be implemented by the first communication device 101 sending a message, to any communication device, e.g., the second communication device 102 or another communication device in the wireless communications network 100.

The set of correspondences 400 may be built for the second communication device 102, that is, per individual UE. However, if the production, that is, the manufacturing, of other devices such as the second communication device 102, e.g., other UEs, is accurate enough regarding antenna position, orientation and phases, the set of correspondences 400 may also be valid per device type, e.g., UE type. Accordingly, in some embodiments, the obtained set of correspondences 400 may be further provided to a type of communication devices corresponding to the second communication device 102. This may be implemented by the first communication device 101 sending a message, to any communication device of the type of communication devices corresponding to the second communication device 102, the message comprising and indication of the obtained set of correspondences 400.

For embodiments wherein the set of correspondences 400 may be divided into the set of angle intervals, when the set of correspondences 400 may have been obtained as per Action 301, the interval to which the relative uplink selected direction of transmission $d_{i,\ \alpha i}$ may belong to, may be selected from the set of correspondences 400, and the corresponding set of antenna weights $\omega_i$ in the set of correspondences 400 may then be used for the uplink transmission of the new radio signal.

The closed-loop precoding may be turned off after the set of correspondences 400 is obtained. This may result in a faster change in precoding and reduced signaling overhead. Alternatively, the closed-loop may be maintained and combined with the open-loop precoding resulting in a faster beam change.

To summarize the foregoing in other words with a particular non-limiting example, embodiments herein may be understood to relate to a method for establishing a relation between uplink transmit direction and transmit antenna weights, that is, precoding, by: a) transmitting uplink sounding, b) Receiving a corresponding precoder, c) associating the precoder with a known preferred transmit direction relative to the orientation of the UE, and d) repeating the above repeatedly until a table is created.

One benefit of embodiments herein is that they enable the advantages of the method described below in the section "Beam direction selection for a radio communications device" for any antenna configuration in a communication device, e.g., a UE. That is, the method of beam direction selection may then not be restricted to linear arrays or similar.

Another further advantage of embodiments herein is that they make open-loop beam forming applicable on FDD.

Yet a further advantage of embodiments herein is that they make open-loop beam forming applicable when TX and Receive (RX) antennas are different in number or configuration.

Another advantage of embodiments herein is that they enable an open-loop beam forming method requiring TX-calibration only.

Embodiments herein may be applied in combination with existing beam-forming methods to improve performance. For example, a closed-loop accurate beam forming may be assisted with a faster open-loop beam change.

Embodiments herein may also reduce signaling and energy by replacing some sounding transmissions with table lookup in the second communication device 102.

Figure 5:
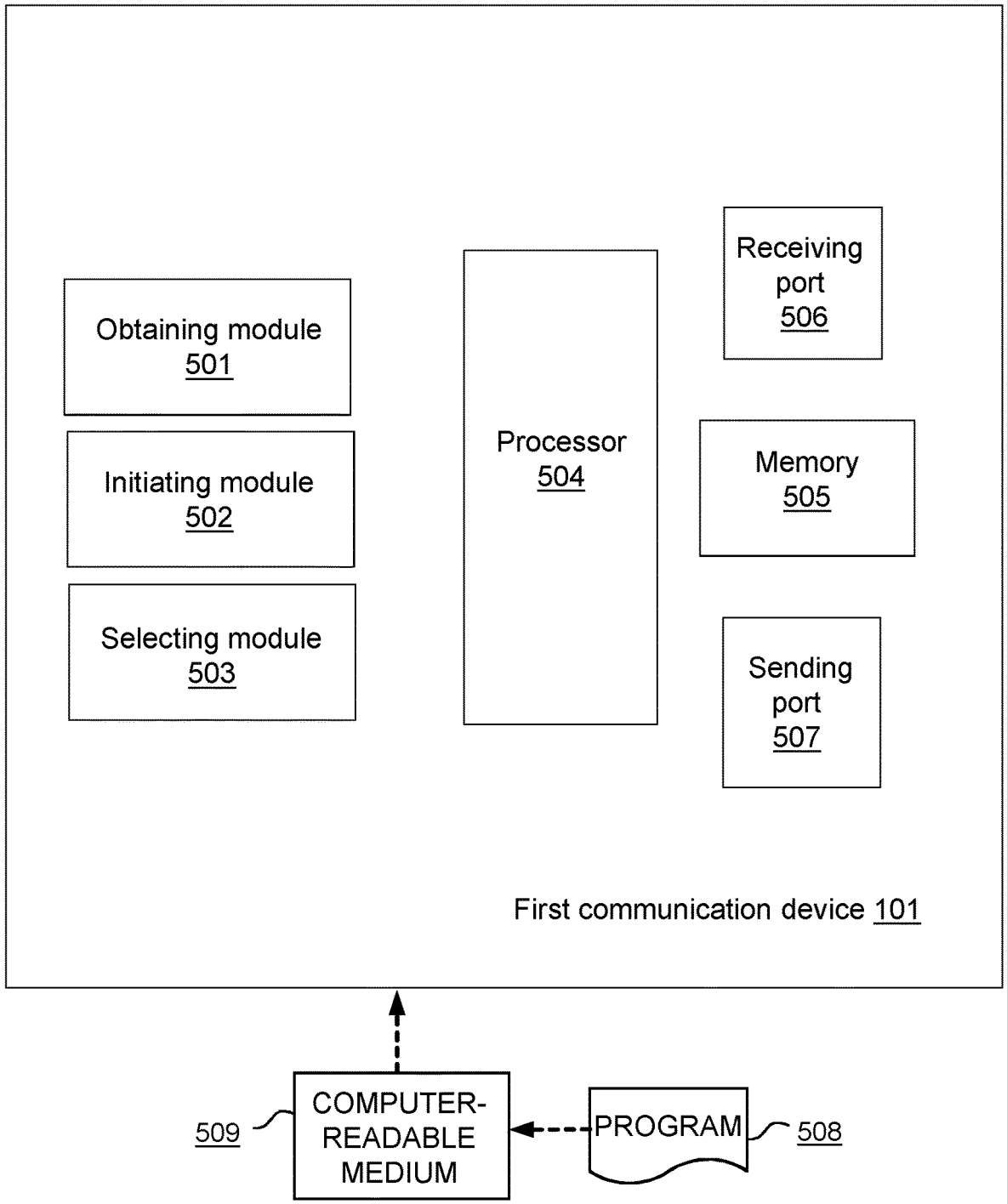
FIG. 5 is a schematic block diagram illustrating embodiments of a first communication device, according to embodiments herein.

To perform the method actions described above in relation to FIGS. 3 and 4, the first communication device 101 may comprise the following arrangement depicted in FIG. 5. As stated earlier, the first communication device 101 may be configured to operate in a wireless communications network 100.

The detailed description of some of the following corresponds to the same references provided above, in relation to the actions described for the first communication device 101, and will thus not be repeated here.

The first communication device 101 is further configured to, e.g. by means of an obtaining module 501 configured to, obtain the set of correspondences 400 associating: i) each set $\omega_i$ of the plurality of sets of antenna weights w, co, configured to have been sent by the third communication device 103 in response to having received the respective set $RSs_i$ of the plurality of sets of radio signals $RSs_1 \ldots RSs_i$ from the set of antenna ports in the second communication device 102, with ii) the respective direction of transmission $d_i$ between the second communication device 102 and the third communication device 103. The respective direction is configured to be relative to the orientation $\alpha_i$ of the second communication device 102. The respective direction of transmission $d_i$ is configured to be the selected direction of transmission $d_{i,\ \alpha i}$.

In some embodiments, the respective direction of transmission $d_i$ may be configured to be selected, for each set $RSs_i$ of the plurality of sets of radio signals $RSs_1 \ldots RSs_i$, based on the strength of the radio link between the second communication device 102 and the third communication device 103.

The first communication device 101 may be one of: a) the same communication device as the second communication device 102, wherein the transmission of the new radio signal may be configured to be from the set of antenna ports; and b) a different communication device than the second communication device 102, wherein the transmission of the new radio signal may be configured to be from the different set of antenna ports.

The first communication device 101 is further configured to, e.g., by means of an initiating module 502 configured to, initiate transmission of the new radio signal, based on the set of correspondences 400 configured to be obtained.

In some embodiments, to initiate transmission may be further configured to comprise transmitting, to one of: the second communication device 102 and the third communication device 103, the new radio signal. The transmitting may be configured to be based on the set of correspondences 400 configured to be obtained.

In some embodiments, each respective direction of transmission $d_i$ may be configured to correspond to the respective angle $\alpha_i$ of direction of transmission, and the set of correspondences 400 configured to be obtained may be organized according to groups of respective angles of direction of transmission.

In some embodiments wherein at least one group of respective angles of direction of transmission may be configured to be associated with more than one respective set of antenna weights $\omega_i$, and the first communication device 101 may be further configured to, e.g., by means of a selecting module 505 configured to, select one of the more than one set of antenna weights $\omega_i$ of the plurality of sets of antenna weights $\omega_1 \ldots \omega_j$, based on the at least one of: i) the most frequent set of antenna weights $\omega_i$ of the more than one set of antenna weights $\omega_i$, ii) the average of the more than one set of antenna weights $\omega_i$, and iii) the channel quality measurements.

In some embodiments, the obtained set of correspondences 400 may be configured to be further provided to the type of communication devices corresponding to the second communication device 102.

The embodiments herein in the first communication device 101 may be implemented through one or more processors, such as a processor 504 in the first communication device 101 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the in the first communication device 101. One such carrier may be in the form of a CD ROM disc. It is however feasible with other data carriers such as a memory stick. The computer program code may furthermore be provided as pure program code on a server and downloaded to the first communication device 101.

The first communication device 101 may further comprise a memory 505 comprising one or more memory units. The memory 505 is arranged to be used to store obtained information, store data, correspondences, configurations, schedulings, and applications etc. to perform the methods herein when being executed in the first communication device 101.

The first communication device 101 may comprise an interface unit to facilitate communications between the first communication device 101 and other nodes or devices, e.g., any the second communications device 102 or the third communication device 103. The interface may, for example, include a transceiver configured to transmit and receive radio signals over an air interface in accordance with a suitable standard.

In some embodiments, the first communication device 101 may receive information from, e.g., any the second communications device 102 or the third communication device 103, through a receiving port 506. In some embodiments, the receiving port 506 may be, for example, connected to one or more antennas in first communication device 101. In other embodiments, the first communication device 101 may receive information from another structure in the wireless communications network 200 through the receiving port 506. Since the receiving port 506 may be in communication with the processor 504, the receiving port 506 may then send the received information to the processor 504. The receiving port 506 may also be configured to receive other information.

The processor 504 in the first communication device 101 may be further configured to transmit or send information to e.g., any the second communications device 102 or the third communication device 103, through a sending port 507, which may be in communication with the processor 504, and the memory 505.

Those skilled in the art will also appreciate that the obtaining module 501, the initiating module 502, and the selecting module 503, described above may refer to a combination of analog and digital modules, and/or one or more processors configured with software and/or firmware, e.g., stored in memory, that, when executed by the one or more processors such as the processor 504, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 501-503 described above may be implemented as one or more applications running on one or more processors such as the processor 504.

Thus, the methods according to the embodiments described herein for the first communication device 101 may be respectively implemented by means of a computer program 508 product, comprising instructions, i.e., software code portions, which, when executed on at least one processor 504, cause the at least one processor 504 to carry out the action described herein, as performed by the first communication device 101. The computer program 508 product may be stored on a computer-readable storage medium 509. The computer-readable storage medium 509, having stored thereon the computer program 508, may comprise instructions which, when executed on at least one processor 504, cause the at least one processor 504 to carry out the action described herein, as performed by the first communication device 101. In some embodiments, the computer-readable storage medium 509 may be a non-transitory computer-readable storage medium, such as a CD ROM disc, or a memory stick. In other embodiments, the computer program 508 product may be stored on a carrier containing the computer program 508 just described, wherein the carrier is one of an electronic signal, optical signal, radio signal, or the computer-readable storage medium 509, as described above.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

Beam Direction Selection for a Radio Communications Device

In this section, the wireless communications network 100 may be referred to as a/the communications system 600. The second communication device 102, or the first communication device 101 in examples wherein it may be the second communication device 102 may be referred to as a/the second radio communications device 602. The third communications device 103 may be referred to as a/the third radio communications device 603.

Figure 6:
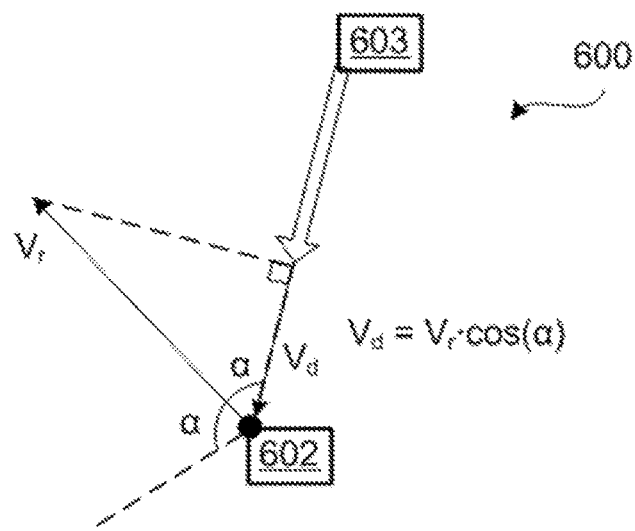
FIG. 6 is a schematic diagram illustrating a communications system according to examples herein.

FIG. 6 is a schematic diagram illustrating a communications system 600 where examples presented in this section may be applied. The communications system 600 comprises a second radio communications device 602 and a third radio communications device 603. The radio communications devices 602, 603 may be configured to communicate with each other over a radio channel.

One of the radio communications devices 602, 603, for example, but not necessarily, the second radio communications device 602, may be part of a wireless device, such as a portable wireless device, mobile station, mobile phone, handset, wireless local loop phone, user equipment (UE), smartphone, laptop computer, tablet computer, wireless modem, or network equipped sensor. The other of the radio communications devices 602, 603, for example, but not necessarily, the third radio communications device 603, may be part of a network node, such as a radio access network node, radio base station, base transceiver station, node B, evolved node B, access point, or access node.

The examples disclosed in this section relate to mechanisms for selecting beam direction for the second radio communications device 602. In order to obtain such mechanisms, there is provided a method performed by the second radio communications device 602. A computer program product comprising code, for example in the form of a computer program, when run on a second radio communications device 602, may cause the second radio communications device 602 to perform the method.

In particular, the disclosed mechanisms in this section for selecting beam direction for the second radio communications device 602 may be based on determining Doppler shift. An initial reference is therefore made to FIG. 7 and FIG. 8 before proceeding further with the description of the examples.

Figure 7:
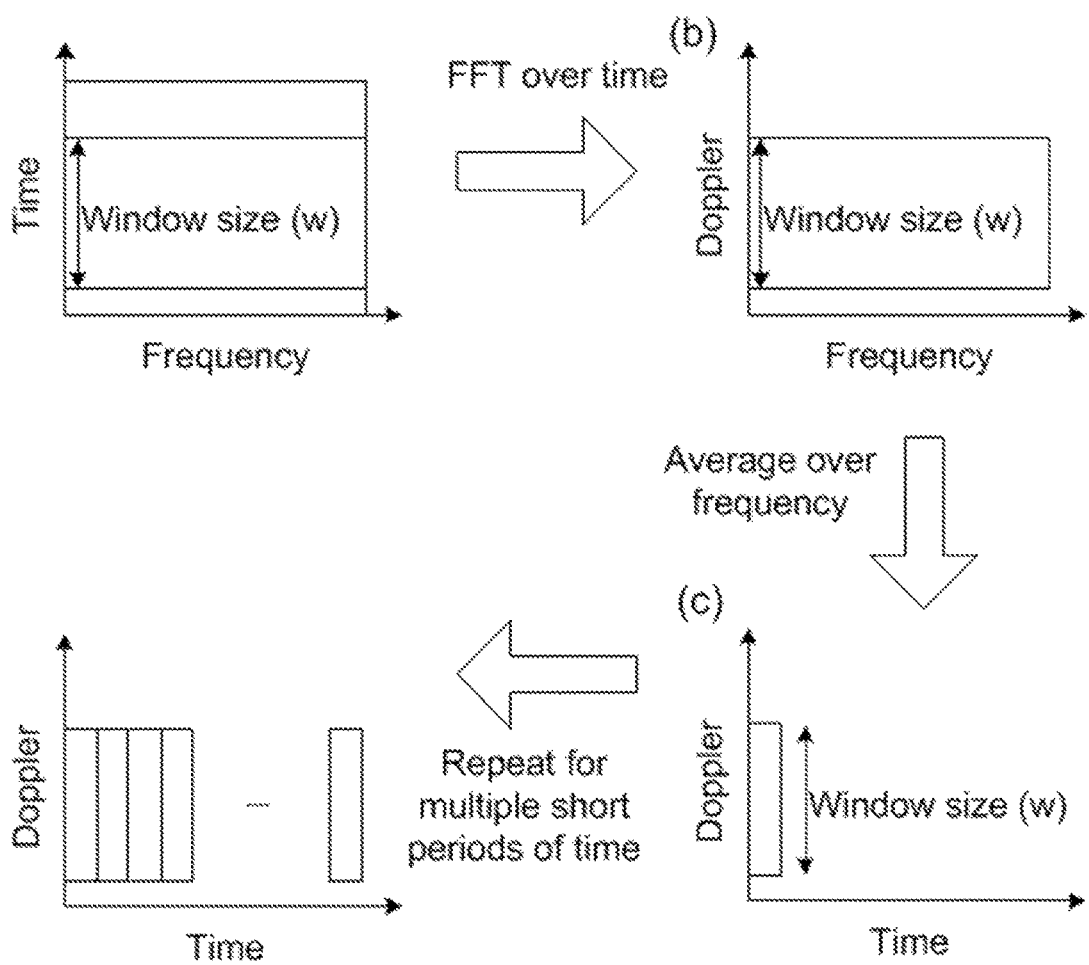
FIG. 7 schematically illustrates how to obtain a Doppler spectrum according to an example herein.

FIG. 7 schematically illustrates how to obtain a Doppler spectrum according to an example. In general terms, the Doppler spectrum may be estimated by calculating a frequency transform, such as the fast Fourier transform (FFT), of radio channel estimates over a relatively short period in the time domain. In more detail, FIG. 7(a) schematically indicates a time-frequency diagram of the radio channel on which radio waves have been transmitted between the second radio communications device 602 and the third radio communications device 603. The FFT is determined for the time-frequency representation over time in a window of length w time units, resulting in the Doppler spectrum-frequency representation in FIG. 7(b). The Doppler spectrum-frequency representation is averaged over frequency, resulting in the average Doppler spectrum representation of FIG. 7(c). Alternatively, the Doppler spectrum in FIG. 7(c) may represent a single frequency of the Doppler spectrum-frequency representation in FIG. 7(b). This procedure may be repeated for multiple short periods of time resulting in the time varying Doppler spectrum of FIG. 7(d). Hence, multiple Doppler shifts may be determined from a short-term frequency transform of a time series of the radio channel estimates.

Figure 8:
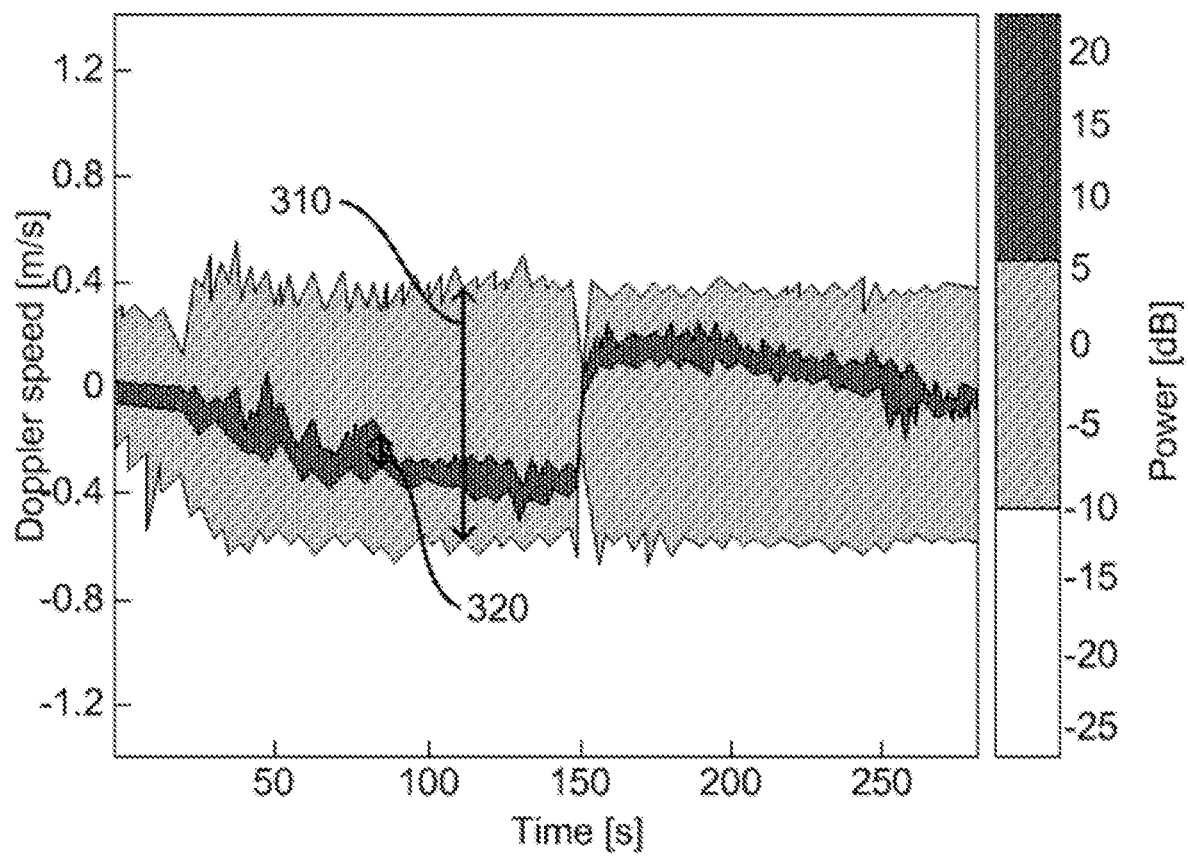
FIG. 8 schematically illustrates a Doppler spectrum according to an example herein.

FIG. 8 shows an example time varying Doppler spectrum averaged over a 100 MHz bandwidth for 135 short period segments, where each short period segment is 2 seconds long, resulting in a total measurement route of 270 seconds. The time varying Doppler spectrum represents radio channel estimates of the radio channel on which radio waves have been transmitted between the second radio communications device 602 and the third radio communications device 603. During the first 15 seconds the second radio communications device 602 is stationary, with respect to the third radio communications device 603 and the surrounding environment, and the Doppler spread of the second radio communications device 602 is close to 0. In this respect, multiple Doppler shifts correspond to the Doppler spread whereas one such Doppler shift corresponds to the Doppler speed. For example, assume that one Doppler shift has a frequency value denoted $f_d$ and that the wavelength of the radio waves is $\lambda$, then the Doppler speed $V_d$ may be determined as $V_d = f_d \cdot \lambda$.

Another term for Doppler speed is radial velocity of the second radio communications device 602. In this respect, the Doppler speed may be understood as the radial velocity relative to the transmitter of the radio waves or relative to any mirrored version of the transmitter caused by reflections of the radio waves. The Doppler speed may be understood as the speed represented by the strongest Doppler shift in the Doppler spectrum. In general terms, the radial velocity may vary as a function of the angle $\alpha$ between the line of sight, assuming that no reflected radio waves are stronger than the radio waves received along the line of sight, and the speed of the second radio communications device 602. In the following, the angle $\alpha$ will be denoted angle of arrival (AoA) or angle of departure (AoD). With reference back to FIG. 6, assuming that the speed of the second radio communications device 602 is $V_r$, then the radial velocity, defining the Doppler speed $V_d$, may be determined according to Eq. (1):

$$V_d = V_r \cdot \cos \alpha \qquad \text{Eq. (1)}$$

With reference again to FIG. 8, in the timer interval between 15 and 270 seconds, the second radio communications device 602 moves with a constant speed, 0.5 m/s, which is seen as a spread 310 in one Doppler shift between about −0.5 and +0.5 m/s. This spread corresponds to the speed $V_r$ of the second radio communications device 602. In the timer interval between 15 to 150 seconds the second radio communications device 602 moves away from the third radio communications device 603. The strongest path, corresponding to the dark part 320 in FIG. 8, is in this case the line-of-sight path and defines the Doppler speed $V_d$, which thus is negative. The Doppler speed of this strongest path is increasingly negative corresponding to that the angle to the third radio communications device 603 is decreasing relatively to the direction of the movement of the second radio communications device 602. At 150 seconds, the second radio communications device 602 turns back and moves towards the third radio communications device 603 and the strongest line-of-sight path then has a positive Doppler speed. Regardless of whether the radio waves have been transmitted or received by the second radio communications device 602, the strongest downlink path may also be the best path for uplink transmission, and vice versa. Thus if a beam direction is selected for uplink transmission it may be in the same direction as the seen strongest line-of-site path in FIG. 8. Particular details of how to select beam direction for the second radio communications device 602 will be disclosed next.

Figure 9:
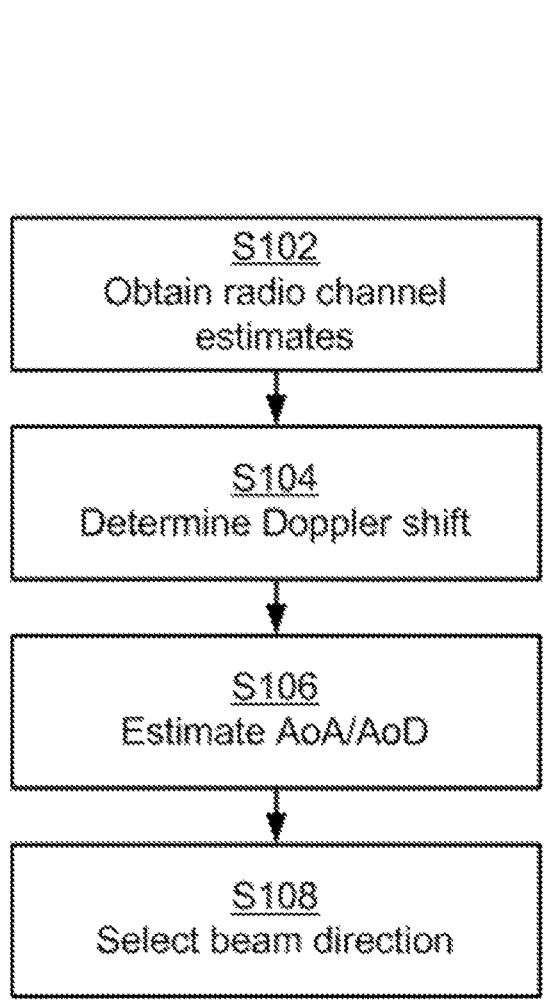
FIG. 9 is a flowchart depicting embodiments of a method in a radio communications device, according to examples herein.
Figure 10:
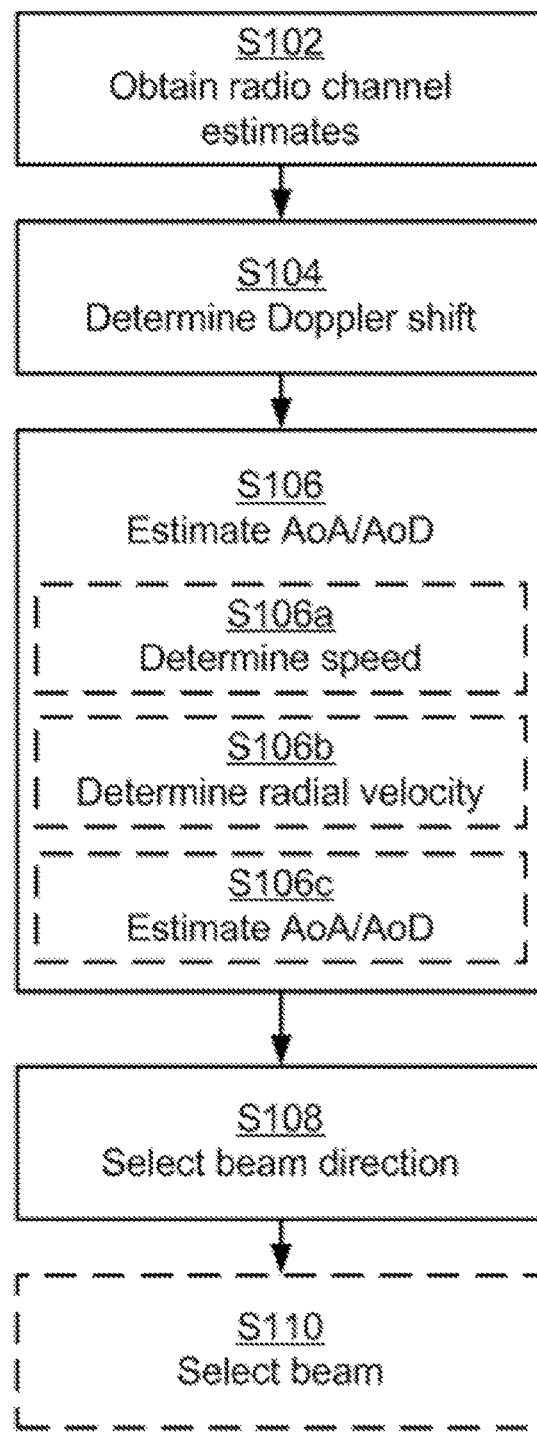
FIG. 10 is a flowchart depicting embodiments of a method in a radio communications device, according to examples herein.

FIG. 9 and FIG. 10 are flow charts illustrating examples of methods for selecting beam direction for the second radio communications device 602. The methods may be performed by the second radio communications device 602.

Reference is now made to FIG. 9 illustrating a method for selecting beam direction for the second radio communications device 602 as performed by the second radio communications device 602 according to an example.

As disclosed above, the disclosed mechanisms in this section for selecting beam direction for the second radio communications device 602 may be based on determining Doppler shift. The Doppler shift may be based on radio channel estimates. Hence, the second radio communications device 602 may, in some examples, be configured to, e.g. by means of the obtaining module 501 configured to, perform step S102:

S102: The second radio communications device 602 may obtain radio channel estimates of a radio channel. Radio waves may have been transmitted between the second radio communications device 602 and the third radio communications device 603 on this radio channel. The radio waves may have been transmitted between the second radio communications device 602 and the third radio communications device 603 at an angle of arrival and departure. In this respect, the radio waves may be generally transmitted in all directions, depending on properties of the transmitter of the radio waves, but only those transmitted in certain of these directions may reach the receiver. One or more of these directions correspond to the angle of arrival and departure. Further, the radio waves may either be transmitted from the third radio communications device 603 to the second radio communications device 602 or from the second radio communications device 602 to the third radio communications device 603. Still further, while the second radio communications device 602 may obtain the radio channel estimates, measurements of the radio channel yielding the radio channel estimates may be performed either by the second radio communications device 602 or the third radio communications device 603, independently of whether the radio waves may have been transmitted from the third radio communications device 603 to the second radio communications device 602 or from the second radio communications device 602 to the third radio communications device 603. Hence, the second radio communications device 602 may obtain the radio channel estimates either by performing channel measurements, or by receiving the radio channel estimates from the third radio communications device 603.

Once the radio channel estimates may have been obtained, the second radio communications device 602 may determine the Doppler shift. Hence the second radio communications device 602 may be configured to, e.g. by means of the obtaining module 501 configured to, perform step S104:

S104: The second radio communications device 602 may determine a Doppler shift from the radio channel estimates. In some aspects determining the Doppler shift may involve the second radio communications device 602 to perform operations, or steps, as described with reference to FIG. 7 above.

The Doppler shift may be used by the second radio communications device 602 to determine an angle α of arrival or departure of the radio waves. Hence the second radio communications device 602 may be configured, e.g. by means of the obtaining module 501 configured to, to perform step S106: S106: The second radio communications device 602 may estimate at least one of the angle α of arrival and departure of the radio waves based on the Doppler shift. Examples of different ways for the second radio communications device 602 to estimate the angle α of arrival or departure of the radio waves will be provided below.

The angle α of arrival or departure may be used by the second radio communications device 602 to select a beam direction. Hence the second radio communications device 602 may be configured to, e.g. by means of the obtaining module 501 configured to, perform step S108:

S108: The second radio communications device 602 may select a beam direction for a signal to be transmitted between the second radio communications device 602 and the third radio communications device 603 over the radio channel according to the estimated angle α of arrival or departure.

In this respect, the signal to be transmitted may be transmitted either by the second radio communications device 602 or by the other third radio communications device 603. Hence, the second radio communications device 602 may be configured to, e.g. by means of the obtaining module 501 configured to, select either a beam direction for a signal to be transmitted by the second radio communications device 602 or a beam direction for a signal to be transmitted by the third radio communications device 603.

Examples relating to further details of selecting beam direction for the second radio communications device 602 will now be disclosed.

The angle α of arrival or departure may be defined in relation to the direction of travel of the second radio communications device 602. This direction of travel may be either absolute or relative the third radio communications device 603.

As disclosed above, the radio channel estimates may be obtained for a radio channel on which radio waves which may have been transmitted between the second radio communications device 602 and the third radio communications device 603. Hence, the radio waves may have been transmitted by either the second radio communications device 602 and received by the third radio communications device 603, or transmitted by the third radio communications device 603 and received by the second radio communications device 602. Hence, the method may be implemented in the thus transmitting radio communications device, for example in a wireless device when the radio waves may be transmitted in an uplink transmission, or the thus receiving radio communications device, for example in a network node when the radio waves may be transmitted in an uplink transmission. Similarly, the estimation of the radio channel may be performed on the direct or the reverse link transmissions. In any case, the Doppler shifts for both uplink and downlink transmissions may typically reflect the angle of arrival in relation to the moving radio communications device of the link, typically the wireless device.

There may be different examples of radio waves transmitted between the second radio communications device 602 and the third radio communications device 603. In general terms, the radio waves represent signal waveforms. The signal waveforms in turn represent signals being transmitted between the second radio communications device 602 and the third radio communications device 603. Examples of such signals may be control signals and data signals. The signals may comprise reference symbols or other types of symbols for which the radio channel estimates of the radio channel may be obtained.

Reference is now made to FIG. 10 illustrating methods for selecting beam direction for the second radio communications device 602 that may be performed by the second radio communications device 602 according to further examples. It is assumed that steps S102, S104, S106, and S108 may be performed as described above with reference to FIG. 9 and a thus repeated description thereof is therefore omitted.

In some aspects, the selected beam direction may define one or more beams for transmitting or receiving the signal. Hence, according to an example, the third radio communications device 603 may be configured to, e.g. by means of the obtaining module 501 configured to, perform step S110:

S110: The second radio communications device 602 may select at least one beam for transmitting or receiving the signal. The at least one beam may be based on the selected beam direction. For example, assuming that the second radio communications device 602 has at least two beams for transmitting or receiving the signal, then that one of the at least two beams that points in a direction closest to the selected beam direction, i.e., the beam direction as selected in step S108, may be selected in step S110. Alternatively, in some aspects at least two beams may be selected in step S110. This may be the case where no single beam points in the selected beam direction. Particularly, according to an example, at least two beams may be selected, and transmission power may be distributed between the at least two beams according to the estimated angle α of arrival or departure. This may allow the signal to be transmitted in several directions with a power distribution between them defined by a relative measured strength of the radio channel estimates.

Further, assuming that the radio waves may be received or transmitted by at least two antenna elements of the second radio communications device 602, the angle α of arrival or departure may then be estimated based on combined radio channel estimates of the radio waves received or transmitted by the at least two antenna elements. Hence, the Doppler shift may be estimated for more than one antenna element, and the angle α of arrival or departure may then be estimated based on combined radio channel estimates for all antenna elements receiving or transmitting the radio waves.

Each beam may correspond to one or more antenna elements of the second radio communications device 602. Hence, according to an example, selecting the at least one beam may result in at least one antenna element being selected at the second radio communications device 602.

There are different types of beam forming that may be applied at the second radio communications device 602 in order to form the one or more beam for transmitting or receiving the signal. Examples for beam forming the at least one beam include, but are not limited to, grid of beam selection, pre-coding and selection of transmit antenna element based on an antenna pattern.

There may be different ways to estimate the angle α of arrival or departure. Different examples relating thereto will now be described in turn.

As described above, FIG. 6 shows the relation between the angle α of arrival or departure, the speed $V_r$ of the second radio communications device 602 and the Doppler speed $V_d$ of the second radio communications device 602. In general terms, Doppler speed may be different for each propagation path. In other words, there may be multiple Doppler speeds for a single second radio communications device 602. The Doppler speed may thus be more a characteristic of the radio waves than of the second radio communications device 602, although the Doppler speed may be scaled by the, physical, speed V of the second radio communications device 602. If the speed V of the second radio communications device 602 and the Doppler speed $V_d$ of the second radio communications device 602 are known, the angle α of arrival or departure may be determined according to Eq. (2):

$$\alpha = \cos^{-1} \frac{V_d}{V_r} \qquad \text{Eq. (2)}$$

Hence, according to an example the third radio communications device 603 may be configured to, e.g. by means of the obtaining module 501 configured to, perform steps S10a, S106b, S106c in order to estimate the angle α of arrival or departure:

S106a: The second radio communications device 602 may determine the speed $V_r$ of the second radio communications device 602.

S106b: The second radio communications device 602 may determine a radial velocity based on the Doppler shift, the radial velocity defining the Doppler speed $V_d$.

S106c: The second radio communications device 602 may estimate the angle α of arrival or departure according to Eq. (1).

S106a, S106b, S106c may be performed as part of step S106.

There may then be different ways to determine the speed $V_r$ of the second radio communications device 602. According to a first example the speed $V_r$ is determined from a global positioning system (GPS) or other positioning measurements. According to a second example, the speed $V_r$ may be estimated from the Doppler spread as described above. In general terms, multiple Doppler shifts may be needed in order to determine the the Doppler spread. Hence, according to an example, multiple Doppler shifts may be determined from the radio channel estimates, where the multiple Doppler shifts may define the Doppler spread of the radio channel estimates. The speed $V_r$ may then be determined based on the Doppler spread.

There may be different ways to determine the Doppler speed $V_d$. According to some aspects, the Doppler speed $V_d$ for the strongest path may be selected. That is, each of the multiple Doppler shifts may correspond to a path along which the radio waves are transmitted. It may be assumed that the strongest path corresponds to the strongest Doppler shift. Hence, according to an example, the radial velocity, which may defines the Doppler speed $V_d$, may be based on a strongest one of the multiple Doppler shifts. Further, a candidate angle of arrival or departure may be estimated for each of the at least two of the multiple Doppler shifts, and the angle α of arrival or departure may be estimated based on the candidate angles of arrival or departure. Alternatively, in some aspects more than one strongest path may be identified including the relative strength of the paths. Hence, according to an example, the radial velocity may be based on relative strengths of at least two of the multiple Doppler shifts. The disclosed method in this section for selecting beam direction is thus not limited to selecting a single direction but may be expanded approaching eigenvalue beamforming.

The orientation of the antenna array of the second radio communications device 602 may not be aligned with the direction of travel of the second radio communications device 602, which may be needed to take into account for when selecting the beam direction based on the angle α of arrival or departure. The second radio communications device 602 may therefore be assumed to have a structured antenna configuration, such as a linear array of antenna elements, to allow easily determined relations between beam direction and antenna element phase shifts for beam forming. In relation thereto, in some examples it may be therefore assumed that the relation between the angle of arrival and the antenna array orientation is known. Such a relation may already be available when using the GPS and by means of existing sensors in common radio communications devices 602, such as so-called smartphones. The ambiguity in direction may give two alternative directions in some environments, such as a city environment where reflections mainly may appear from the sides and not from above or below. In more detail, an angle relative to the movement of the second radio communications device 602 may reduce the ambiguity in direction to two ambiguous alternatives instead of a "cone" of directions in three dimensions. One method to resolve the ambiguity in direction may be to test both these alternatives, but there are also methods to resolve the ambiguity that involve utilizing e.g. movement of the second radio communications device 602 in multiple directions over time, i.e. by testing which of the ambiguous direction that stays the same when changing the direction of movement in order to resolve the ambiguity in direction.

Advantageously, the method described in this section provides efficient beam direction selection. One or more beams may then be selected from the selected beam, thus resulting in efficient beam selection.

Advantageously, the method described in this section provides an efficient open-loop approach that may be applicable to TDD as well as frequency division duplex (FDD).

Advantageously, the method described in this section provides an efficient open-loop approach that is applicable even when transmit antennas and receive antennas at the radio communications device may be different in number or configuration.

Advantageously, the method described in this section may be applied in combination with existing beam forming methods to improve performance.

Advantageously, the method described in this section provides is more efficient than open-loop approaches for moving radio communications devices.

The invention claimed is:

1. A method performed by a first communication device operating in a wireless communications network, the method comprising:
   obtaining a set of correspondences associating:
   i. each set ($\omega_i$) of a plurality of sets of antenna weights ($\omega_1 \ldots \omega_i$) having been sent by a third communication device in response to having received a respective set ($RS_{si}$) of a plurality of sets of radio signals ($RS_{s1} \ldots RS_{si}$) from a set of antenna ports in a second communication device, with
   ii. a respective direction of transmission ($d_i$) between the second communication device and the third communication device, the respective direction of transmission ($d_i$) being relative to an orientation ($\alpha_i$) of the second communication device, and the respective direction of transmission ($d_i$) being a selected direction of transmission ($d_i, \alpha_i$), wherein each respective direction of transmission ($d_i$) corresponds to a respective angle ($\alpha_i$) of direction of transmission; and
   initiating transmission of a new radio signal, based on the obtained set of correspondences,
   wherein the obtained set of correspondences is further provided to a type of communication device corresponding to the second communication device, and the second communication device is a type of device having a beamforming capability.

2. The method according to claim 1, wherein the respective direction of transmission ($d_i$) is selected, for each set (RSsi) of the plurality of sets of radio signals (RSs1 . . . RSsi), based on a strength of a radio link between the second communication device and the third communication device.

3. The method according to claim 2, wherein the first communication device is one of:

a. a same communication device as the second communication device, and wherein the transmission of the new radio signal is from the set of antenna ports; and
b. a different communication device than the second communication device, and wherein the transmission of the new radio signal is from a different set of antenna ports.

4. The method according to claim 2, wherein the initiating transmission further comprises transmitting, to one of: the second communication device and the third communication device, the new radio signal, the transmitting being based on the obtained set of correspondences.

5. The method according to claim 2, wherein the obtained set of correspondences is organized according to groups of the respective angles of the direction of transmission.

6. The method according to claim 5, wherein at least one group of the respective angles of the direction of transmission is associated with more than one respective set of antenna weights ($\omega_i$), and wherein the method further comprises:
   selecting one of the more than one set of antenna weights ($\omega_i$) of the plurality of sets of antenna weights ($\omega_1 \ldots \omega_i$), based on at least one of:
   i. a most frequent set of antenna weights ($\omega_i$) of the more than one set of antenna weights ($\omega_i$);
   ii. an average of the more than one set of antenna weights ($\omega_i$); and
   iii. channel quality measurements.

7. The method according to claim 1, wherein the first communication device is one of:
   a. a same communication device as the second communication device, and wherein the transmission of the new radio signal is from the set of antenna ports; and
   b. a different communication device than the second communication device, and wherein the transmission of the new radio signal is from a different set of antenna ports.

8. The method according to claim 1, wherein the initiating transmission further comprises transmitting, to one of: the second communication device and the third communication device, the new radio signal, the transmitting being based on the obtained set of correspondences.

9. The method according to claim 1, wherein the obtained set of correspondences is organized according to groups of the respective angles of the direction of transmission.

10. The method according to claim 9, wherein at least one group of the respective angles of the direction of transmission is associated with more than one respective set of antenna weights ($\omega_i$), and wherein the method further comprises:
    selecting one of the more than one set of antenna weights ($\omega_i$) of the plurality of sets of antenna weights ($\omega_1 \ldots \omega_i$), based on at least one of:
    i. a most frequent set of antenna weights ($\omega_i$) of the more than one set of antenna weights ($\omega_i$);
    ii. an average of the more than one set of antenna weights ($\omega_i$); and
    iii. channel quality measurements.

11. A non-transitory computer-readable storage medium, having stored thereon a computer program, comprising instructions which, when executed on at least one processor, cause the at least one processor to carry out a method performable by a first communication device in a wireless communications network, the method comprising:
    obtaining a set of correspondences associating:
    i. each set ($\omega_i$) of a plurality of sets of antenna weights ($\omega_1 \ldots \omega_i$) having been sent by a third communication device in response to having received a respective set ($RS_{si}$) of a plurality of sets of radio signals ($RS_{s1}$ ... $RS_{si}$) from a set of antenna ports in a second communication device, with ii. a respective direction of transmission ($d_i$) between the second communication device and the third communication device, the respective direction of transmission ($d_i$) being relative to an orientation ($\alpha_i$) of the second communication device, and the respective direction of transmission ($d_i$) being a selected direction of transmission ($d_i,\alpha_i$), wherein each respective direction of transmission ($d_i$) corresponds to a respective angle ($\alpha_i$) of direction of transmission; and initiating transmission of a new radio signal, based on the obtained set of correspondences, wherein the obtained set of correspondences is further provided to a type of communication device corresponding to the second communication device, and the second communication device is a type of device having a beamforming capability.

12. A first communication device configured to operate in a wireless communications network, the first communication device being further configured to:

obtain a set of correspondences associating:

i. each set ($\omega_i$) of a plurality of sets of antenna weights ($\omega_1$ ... $\omega_i$) configured to have been sent by a third communication device in response to having received a respective set ($RS_{si}$) of a plurality of sets of radio signals ($RS_{s1}$ ... $RS_{si}$) from a set of antenna ports in a second communication device, with ii. a respective direction of transmission ($d_i$) between the second communication device and the third communication device, the respective direction of transmission ($d_i$) being configured to be relative to an orientation ($\alpha_i$) of the second communication device, and the respective direction of transmission ($d_i$) being configured to be a selected direction of transmission ($d_i,\alpha_i$), wherein each respective direction of transmission ($d_i$) corresponds to a respective angle ($\alpha_i$) of direction of transmission; and initiate transmission of a new radio signal, based on the set of correspondences configured to be obtained, wherein the obtained set of correspondences is configured to be further provided to a type of communication device corresponding to the second communication device, and the second communication device is a type of device having a beamforming capability.

13. The first communication device according to claim 12, wherein the respective direction of transmission ($d_i$) is configured to be selected, for each set ($RS_{si}$) of the plurality of sets of radio signals ($RS_{s1}$ ... $RS_{si}$), based on a strength of a radio link between the second communication device and the third communication device.

14. The first communication device according to claim 12, wherein the first communication device is one of:

a. a same communication device as the second communication device, and wherein the transmission of the new radio signal is configured to be from the set of antenna ports; and b. a different communication device than the second communication device, and wherein the transmission of the new radio signal is configured to be from a different set of antenna ports.

15. The first communication device according to claim 12, wherein initiating the transmission comprises transmitting, to one of: the second communication device and the third communication device, the new radio signal, the transmitting being configured to be based on the set of correspondences configured to be obtained.

16. The first communication device according to claim 12, wherein the set of correspondences configured to be obtained is organized according to groups of the respective angles of the direction of transmission.

17. The first communication device according to claim 16, wherein at least one group of the respective angles of the direction of transmission is configured to be associated with more than one respective set of antenna weights ($\omega_i$), and wherein the first communication device is further configured to:

select one of the more than one set of antenna weights ($\omega_i$) of the plurality of sets of antenna weights ($\omega_1$ ... $\omega_i$), based on at least one of:

i. a most frequent set of antenna weights ($\omega_i$) of the more than one set of antenna weights ($\omega_i$);

ii. an average of the more than one set of antenna weights ($\omega_i$); and iii. channel quality measurements.

* * * * *